Sept. 23, 1969  R. SALCEDO GUMUCIO  3,468,714
BATTERY COMPRISING A CARBON ANODE CONTAINING
A RADIOACTIVE CATALYST
Filed May 12, 1961  5 Sheets-Sheet 1

INVENTOR:
RICARDO SALCEDO GUMUCIO
BY
ATTORNEY

Sept. 23, 1969   R. SALCEDO GUMUCIO   3,468,714
BATTERY COMPRISING A CARBON ANODE CONTAINING
A RADIOACTIVE CATALYST Filed May 12, 1961                                    5 Sheets-Sheet 3

Fig. 7

METHANOL FUEL CELLS No.5 & 5X $I_D$ 50ma at room temperature for 21 hrs. then heated to 60°C under constant discharge. New readings began 1 hr later

Fig. 8

METHANOL FORMALDEHYDE FUEL CELLS No.5 & No.5X

Fig. 9

COMPARISON OF HYDROGEN ELECTRODES
T° = 50°C to 60°C

NOTE  Voltage readings for radioactive electrodes represent an average value calculated after an 8 hr discharge at the indicated current density INVENTOR:
RICARDO SALCEDO GUMUCIO
BY Irving Holtzman
ATTORNEY

INVENTOR:
RICARDO SALCEDO GUMUCIO
BY Irving Holtzman
ATTORNEY

3,468,714
BATTERY COMPRISING A CARBON ANODE
CONTAINING A RADIOACTIVE CATALYST
Ricardo Salcedo Gumucio, Madrid, Spain, assignor to Yardney International Corporation, New York, N.Y., a corporation of New York
Continuation-in-part of application Ser. No. 62,775, Oct. 14, 1960. This application May 12, 1961, Ser. No. 109,557
Int. Cl. H01m 27/04, 27/10
U.S. Cl. 136—86                                      3 Claims This invention relates to electrochemical systems wherein a reaction occurs at the interface between a solid body and an electrolyte. This application is a continuation-in-part of application Ser. No. 62,775, filed Oct. 14, 1960, now abandoned.

In the case of galvanic cells and with cells having non-consumable electrodes known as fuel cells, for example, the problem of catalytic activation of electrode surfaces is highly important. Dissociation into atomic ions is achieved by catalytically activating the electrodes in these types of electrochemical systems. In the majority of cases, however, these phenomena are endothermic and the probability of their occurrence is very small. Accordingly, chemisorbing catalysts are generally employed to increase probability of molecular dissociation which results in ionization. While such chemisorbing catalysts do achieve limited success, they are subject to poisoning. There exists, therefore, a need for catalysts which do not exhibit these disadvantages when employed in electrochemical processes. Catalysts are also useful in suppressing polarization at the electrodes of conventional batteries with consumable electrodes.

Accordingly, it is a primary object of this invention to provide an improved catalyst for electrochemical processes of this and related characters.

It is another object of the invention to provide a process for improving the performance of fuel cells and other electrochemical generators of energy.

It is still a further object of the invention to speed the ionization of molecules and/or atoms to accelerate the electrochemical reactions.

Other objects and advantages of the invention will be apparent from the following description.

The above objects are attained by employing radioactive material to catalyze electrochemical processes; this includes the activation of fuel cells and the depolarization of battery cells with reacting electrodes. Although the invention is broadly applicable to any electrochemical process, it will be illustrated in its particular application to fuel cells and alkaline batteries for the purpose of simplicity. Such illustrations, however, are not to be construed as limiting the scope of the instant invention.

Any radioisotope which has a reasonable half life and is compatible with the system to be activated can be employed. They may be α and/or β and/or γ emitting materials. Such radioisotopes include carbon 14, nickel 63, tritium $H_1^3$, silicon 32, cobalt 60, polonium 210, promethium 147, Sr 90, Te 99 and the like. This list is merely illustrative and not limitative. It will be readily apparent to those skilled in the art that any other compatible radioisotope having a minimum half life of the order of a discharge period of a cell can be utilized in carrying out the practice of this invention.

The compatible radioisotope employed in the practice of this invention can be utilized in a wide variety of forms. The radioisotope can be employed as an isolated or conductive element, or also as a component of a soluble or insoluble compound so long as it remains as such and does not induce interfering secondary effects or create safety hazards. The necessary amount of any particular radioisotope utilized can be readily determined by experimentation. In a fuel cell, for example, the quantity of radioactive material should suffice to activate the system and may be segmented to increase the activity of the system. Use of the isotope in increasing amounts brings about an activation of the surface of the electrode in a cell at the solid/liquid and solid/gas interfaces in a medium that is dependent solely on radioactivity and, consequently, unlimited activation not subject to catalyst poisoning is achieved.

As pointed out hereinabove, the radioisotopes can be employed in widely varying forms. Tritium $H_1^3$, for example, can be used as $(H_1^3)_2O$ in solution in the electrolyte for the simultaneous activation of both cathodic and anodic processes. Carbon 14 can be employed as a colloid in a volatile solvent for impregnating carbon, silver or nickel electrodes. It can also be utilized in the form of a soluble alkaline carbonate or in the form of an insoluble salt. On the other hand, silicon 32 can be used as a carbide component for electrodes in an acid medium. Cobalt 60 can be employed in the form of a hydroxide in the positive electrode of alkaline batteries, and nickel 63 can be utilized in systems using nickel as a positive material, such as nickel-iron or nickel-cadmium batteries, in oxide or hydroxide form, or as a metal or its hydroxide in positive electrodes of systems employing a more noble positive material, e.g., silver-zinc or silver-cadmium cells. Promethium may be used in the form of an aqueous solution of promethium chloride which is eventually electrolytically reduced to the promethium metal on the electrode. Polonium may be electrolytically deposited on the electrodes.

In addition to being employed alone to catalyze electrochemical reactions, the radioactive surface activators can be utilized in combination with conventional non-radioactive catalytic materials in carrying out the practice of this invention. When so employed, the materials, generally used in a finely divided state, speed up the reaction rate in such a way that heavier currents can be attained. Among the many non-radioactive catalytic materials which may be employed with the radioactive surface activators are cobalt nitrite, nickel hydroxide, nickel nitrate, silver nitrate, copper, silver, platinum and gold. Regardless of which particular material is employed, it must be compatible with the system in which it is used.

The amount of radioactive material that may be incorporated in an electrode in accordance with the present invention may vary from about .1 of a microcurie to 1 curie or more per square centimeter of electrode surface. Good results are obtained when the radioactive content of the material in the electrode is in the order of about .1 microcurie to about 10 millicuries per square centimeter of of electrode surface.

Another aspect of the present invention involves the use of a known catalyst in the form of its radioactive compounds to improve the performance of the electrode. In this fashion advantage may be taken of the catalytic activity of the ordinary form of the material and the catalytic activity of the radioactive form of the material. Thus, for example, it is known that cobalt oxide improves the oxygen electrode (silver or carbon) of the fuel cell. In accordance with this aspect of the invention the cobalt oxide is employed in whole or in part in the form of the radioactive compound wherein the cobalt is present as cobalt 60.

An electrochemical generator of energy (e.g. a fuel cell) embodying the principles of this invention can utilize all types of electrolytes. These include fused-salt electrolytes, solid electrolytes (e.g. ion exchange membrane), liquid electrolyte adsorbed or absorbed on a separator in an appropriate container along with solid positive and negative electrodes. This applies also to primary and secondary batteries with acid or alkaline electrolyte.

The use of the radiation of radioactive material to improve the efficiency of electrochemical generators in accordance with the present invention has particular usefulness in the so-called fuel cell where it has wide applicability. It may for example be incorporated in any oxidant electrode. A large number of oxidant electrodes known in the prior art may be used. By way of example the oxidant electrode may be an oxygen electrode, an air electrode, chlorine electrode, etc.

Similarly, the radioactive material may be incorporated in reductant electrodes. As in the case of the oxidant electrode a large number of reductant electrodes known in the prior art may be used such as hydrogen electrode; carbon monoxide electrodes; natural gas electrodes; hydrocarbon electrodes such as methane, ethane, etc.; coal electrodes; aldehyde electrodes such as formaldehyde or acetaldehyde electrodes; alcohol electrodes, such as methyl, ethyl, propyl alcohol electrodes; combination aldehyde-alcohol electrodes such as formaldehyde and methyl alcohol; metal electrodes such as zinc, magnesium, etc. The radioactive material may also be incorporated in the nickel and/or carbon electrodes of the hydrogen-oxygen electrode which employs an aqueous alkaline solution as electrolyte.

Radioactive material may also be used to increase the efficiency of the molten salt electrolyte type of fuel cell. In this case the reducing fuels employed may be carbon monoxide, methane, natural gas, water gas or mixtures of hydrocarbons. The oxidant may be air or oxygen. The electrolyte in this case may be a mixture of alkali metal carbonates. The electrode elements consist of porous metallic plates of iron, nickel or silver and a metal oxide. The radioactive material may be introduced into the electrodes as $C^{14}$ or nickel 63.

Similarly, in accordance with the present invention, appropriate radioactive material may be incorporated in the electrodes of the so-called "Redox Fuel Cells" to increase the efficiencies of these cells. In a like manner the electrodes of the "Regeneration Type" fuel cells and the so-called "consumable electrode" type as well as the "Alkali Amalgam" type fuel cells may be impregnated with radioactive materials in accordance with the present invention.

Representative systems embodying this invention are shown diagrammatically in the accompanying drawing in which.

Figure 1:
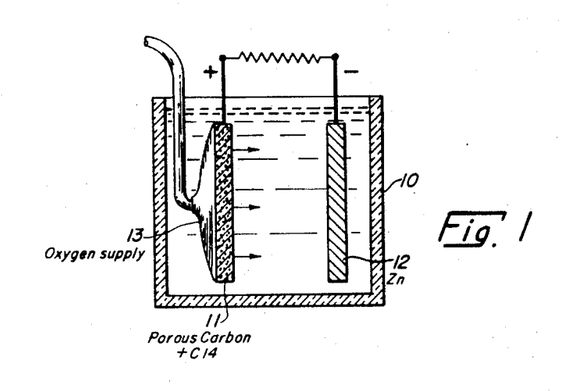
FIG. 1 illustrates an electrochemical cell with non-consumable positive electrode.

FIG. 1 shows a container 10 filled with an aqueous solution of potassium hydroxide as an electrolyte; two electrodes 11, 12 being immersed therein. A source of gaseous oxygen has an outlet 13 opening in the vicinity of the carbon electrode 11 which contains radioactive carbon $C^{14}$. In operation, the oxygen is delivered to the vicinity of the positive carbon electrode 11 where, under the catalytic action of the radioactive carbon, it combines with water to form $OH^-$ ions which react with the zinc electrode 12 to form zinc oxide and water.

Figure 2:
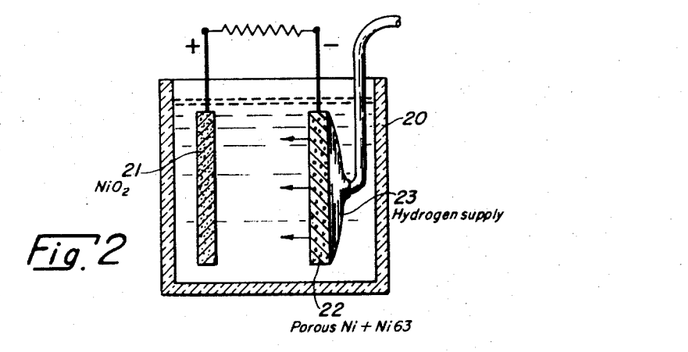
FIG. 2 illustrates a similar cell with non-consumable negative electrode.

A similar arrangement in FIG. 2 consists of a container 20 filled with an aqueous solution of potassium hydroxide as an electrolyte; two electrodes 21, 22 being immersed therein. The positive electrode 21 is ordinary nickel oxide. The negative electrode is porous nickel containing nickel 63. A source of gaseous hydrogen has an outlet 23 opening in the vicinity of the radioactive negative electrode 22. In operation, the gaseous hydrogen is delivered in the vicinity of the negative electrode 22 where the radioactive nickel catalyzes it, thereby causing it to ionize and lose electrons. The resulting $H^+$ ions then reduce the nickel-oxide positive electrode to nickel.

Figure 3:
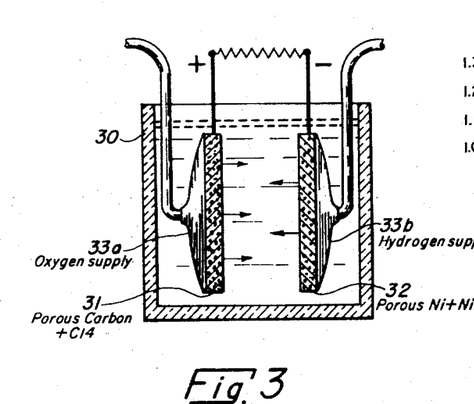
FIG. 3 illustrates a complete fuel cell according to this invention.

The fuel cell of FIG. 3 consists of a container 30 filled with an aqueous solution of potassium hydroxide as an electrolyte; two electrodes 31, 32 are immersed therein. The positive electrode 31 consists of porous carbon impregnated with $C^{14}$. The negative electrode 32 is porous nickel containing radioactive nickel 63. A source of gaseous oxygen has an outlet 33a opening in the vicinity of positive electrode 31. A source of gaseous hydrogen has an outlet 33b opening in the vicinity of the negative electrode 32.

In operation, gaseous oxygen delivered to the vicinity of the radioactive carbon electrode 31 is catalyzed by the $C^{14}$ and again gives rise to $OH^-$ ions. Simultaneously, gaseous hydrogen delivered to the vicinity of the radioactive negative electrode is ionized by the nickel 63 to yield $H^+$ ions which then combine with the $OH^-$ ions to form water.

In order to illustrate the invention more fully, the following examples are set forth. It is to be understood, however, that the invention is not limited thereto.

EXAMPLE I (a) A carbon electrode and a zinc negative electrode were immersed in a 30% aqueous solution of potassium hydroxide in a container. Gaseous oxygen was bubbled through the electrolyte in the vicinity of the carbon electrode.

(b) A like cell was constructed in which the carbon electrode was impregnated with carbon 14 in a toluene solution and which became radioactive to the extent of approximately 0.5 microcuries after the evaporation of the toluene.

Both cells were discharged simultaneously at room temperature (about 20° C.) and atmospheric pressure. Readings were taken at 5-minute intervals. The terminal voltage of the cells was measured while the current was gradually increased. The results are shown in the following table.

TABLE 1

| | Terminal Voltage With Radioactive Isotope | Voltage Without Radioactive Isotope |
|---|---|---|
| Current (milliamperes): | | |
| 0 | 1.42 | 1.40 |
| 2 | 1.39 | 1.32 |
| 10 | 1.35 | 1.10 |
| 50 | 1.25 | 1.02 |
| 100 | 1.13 | 0.80 |
| 150 | 1.02 | 0.59 |
| 200 | 0.94 | 0.40 |

These data were reproduced in a series of tests and show that the galvanic system was activated isotopically by means of carbon 14.

Similar cells were constructed as I(a) above excepting that Cd or Fe were used as electrodes.

EXAMPLE II

Two cells were constructed each containing one nickel-oxide positive electrode and one porous-nickel negative electrode. The porous-nickel electrode of one cell was impregnated with radioactive nickel 63 by treatment with the chloride of nickel 63. The porous-nickel electrode of the other cell was treated with non-radioactive nickel chloride. Both sets of electrodes were placed in a receptacle containing potassium-hydroxide solutions and hydrogen gas was bubbled around the porous-nickel electrodes.

Both cells were discharged simultaneously at room temperature (about 20° C.) and atmospheric pressure. The terminal voltage of the cells was again measured at 5-minute intervals with progressively increased currents. The results are shown in the following table.

TABLE 2

| Current (milliamperes): | Terminal Voltage With Radioactive Isotope | Voltage Without Radioactive Isotope |
|---|---|---|
| 0 | 1.33 | 1.33 |
| 2 | 1.25 | 1.13 |
| 3 | 1.21 | 1.09 |
| 4 | 1.27 | 1.06 |
| 5 | 1.11 | 1.02 |
| 6 | 1.07 | 0.90 |
| 7 | 1.03 | 0.72 |
| 8 | 1.00 | 0.50 |
| 10 | 0.93 | 0.30 |

These data were reproduced in a series of tests and show that the galvanic system was activated isotopically by means of nickel 63.

The above results in the third column were not altered materially when non-radioactive catalysts such as silver and copper were included in the positive active materials in small amounts.

Figure 4:
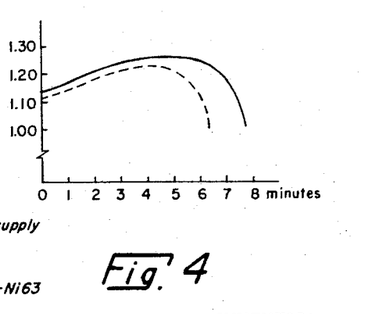
FIG. 4 shows a graph illustrative of the performance of a silver-zinc cell embodying the invention.

The application of the invention to silver-zinc batteries, in accordance with the following Example III, is illustrated in FIG. 4 which shows at (a) the terminal voltage of a conventional cell of this type, the corresponding voltage of a similar cell with a catalyst according to the invention having been indicated at (b). Both cells were discharged at constant current.

EXAMPLE III

Three high-rate silver-zinc secondary cells with concentrated alkaline electrolyte (KOH), four silver positive electrodes, five zinc-oxide negative electrodes and conventional inter-electrode separators of regenerated cellulose (e.g. as described in Yardney Patent No. 2,610,219) were set up. One cell contained approximately 0.5 microcuries of radioactive carbon ($C^{14}$) in the positive plates. The other two contained no $C^{14}$. A charging test and a discharging test were made. In place of $C^{14}$ as the radioactive material, nickel 63 may be employed.

In the charging test all said three cells were charged in series to gassing point at a current of 0.855 ampere.

The respective ampere/hour imput to gassing point was 5.43 ampere/hours for the cell containing radioactive carbon compared with 3.25 and 3.10 ampere/hours respectively for the two cells containing no radioactive material. This test shows that the radioactive material in the cell increased the useful energy input.

In the discharging test, each cell was discharged at the current of 42.6 amperes. They were discharged to a point where the cell voltage dropped below 1.0 volt. The ampere/hour output for the radioactive cell was 4.26 ampere/hours compared with 2.84 and 2.75 ampere/hours respectively for the non-radioactive cells. These results show the increased ampere/hour output of the cell containing radioactive carbon ($C^{14}$). The plateau voltage of the radioactive cell during discharge was 1.23 volts compared to 1.20 and 1.18 volts, respectively, for the non-radioactive cells.

EXAMPLE IV

Promethium-carbon or silver-oxygen electrode

A promethium-oxygen electrode which is useful in the present invention is a high density carbon or high density compressed silver powder molded plate. The porosity of the carbon or silver plate is such that when at least 1 atmosphere of $O_2$ is applied to the face of the electrode in the cell the electrolyte will not be displaced from the electrode. This can be determined, empirically, by feeding $O_2$ at one atmosphere pressure to the oxygen electrode. If gas bubbles are seen escaping on the electrolyte side of the electrode, this is an indication that the material is too porous. When no gas bubbles will pass through the electrode this is an indication that the electrode has the proper porosity.

When a high density carbon plate is used it is advantageous to impregnate the plate with silver. This may be accomplished by immersing the plate in a silver nitrate solution containing between 2 to 3 grams of silver nitrate per 100 ml. of water until the plate is saturated. The plate is then dried at about 60° C. and the silver nitrate is thermally decomposed in a hydrogen atmosphere in an oven at a temperature of about 450° C. until the silver nitrate is reduced to metallic silver. A carbon electrode prepared in this manner has metallic silver particles uniformly distributed throughout the electrode in finely divided form.

Although this electrode has utility per se in an electrochemical generator, it is particularly useful in the present invention when rendered radioactive by impregnation with a radioactive promethium. This is effected by impregnating the carbon or silver electrode prepared in the above manner with an aqueous solution of radioactive promethium chloride having for example an activity of from 1 millicurie per cc. to 10 millicuries per cc. However, solutions of higher activity going up to 1 curie and higher may also be employed. In this case the electrode had an activity of about 1 millicurie per square centimeter of electrode surface. After impregnation of the plate with the promethium chloride solution, the plate is dipped in a concentrated aqueous solution of KOH to precipitate promethium compound in the electrode. A suitable solution is 20% aqueous KOH. The plate is then washed and dried in an oven at 60° C. The promethium precipitate is reduced electrolytically in an alkaline bath (preferably KOH) until hydrogen is evolved indicating the termination of the reduction.

Although this electrode has been described as an oxygen electrode it obviously may be used in conjunction with other oxidants or reductants.

EXAMPLE V

Promethium-sintered-silver oxygen electrode

A sintered silver electrode was prepared in accordance with U.S. Patent 2,818,462.

Silver powder is compressed into flat, plate-like form. The compacted mass is thereupon placed between two flat blocks of preferably ceramic material, capable of withstanding elevated temperatures, whereupon the whole assembly is placed in an oven at such temperature and for such length of time as to cause sintering of the comminuted silver. Temperatures ranging from 650° to 800° C. and baking times of 1 hour or less have been found suitable. This operation converts the powder into a body of spongy yet mechanically rigid character.

This plate is immersed in and saturated with an aqueous solution of radioactive promethium chloride having an activity of from 1 millicurie per cc. to 10 millicuries per cc. Solutions of higher activity may also be used. As in Example IV the electrode produced had an activity of about 1 millicurie per square centimeter of electrode surface. To convert the promethium chloride to an insoluble compound which would precipitate in the interstices of the sintered silver electrode the promethium chloride treated electrode is impregnated with a concentrated solution of KOH (20%). The electrode is then washed and dried in an oven at 60° C. The promethium compound is then electrolytically reduced in an alkaline solution until hydrogen begins to evolve indicating the termination of the promethium reduction. If desired, in addition, conventional catalyst may also be incorporated into this electrode e.g. cobalt nitrite, nickel hydroxide, nickel nitrite, silver nitrate. Again, although the electrode is described as an oxygen electrode it obviously has other uses.

EXAMPLE VI

Promethium-carbon or silver fuel electrode

High density carbon or compressed Raney nickel powder material is molded into form in the preparation of this electrode. As in the case with the promethium-carbon or silver-oxygen electrode the porosity is such that at least 1 atmosphere of a gaseous fuel may be applied to the electrode without displacing the electrolyte. When carbon is used there may also be incorporated in the electrode a hydrogen absorbing catalyst e.g. platinum chloride, palladium chloride, palladium nitrate. Particularly good results are obtained by impregnating the carbon electrode, preferably in vacuum with an aqueous solution of palladium chloride or palladium nitrate containing from about 1 to 5 grams of salt per 100 cc. of water. After impregnating the carbon electrode with these catalysts, the electrode is dried in an oven at 60° C. The palladium or platinum salt is then reduced to the metal in a hydrogen atmosphere at a temperature of from 300°–400° C.

The radioactive promethium catalyst is then incorporated in the carbon electrode using the same procedure employed in the preparation of the promethium-carbon or silver-oxygen electrode described above (Example IV).

EXAMPLE VII

Methanol fuel cell (two chamber)

This embodiment of the invention may best be described with reference to FIGS. 5 and 6 of the drawings. The cell comprises a casing 40 made of any suitable inert material e.g. polymerized methyl methacrylate resin (Lucite) and divided into an oxygen electrode compartment 41 and a fuel electrode compartment 43 by a divider 42 made of the same material. A window is cut in divider 42 to accommodate a porous Alundum plate 44 which is glued to divider 42.

The oxygen electrode is designated generally at 46 and comprises a Lucite block 48 through which an oxygen conduit 50 is bored which leads into a lower chamber 52. Chamber 52 has a window cut in one side to accommodate the active plate 54 of the electrode. Active plate 54 may be the "promethium-carbon oxygen" electrode, "promethium-silver oxygen" electrode described in Example IV above or the "promethium-sintered silver oxygen" electrode described above in Example V. In a similar fashion, other oxygen electrodes described herein impregnated with radioactive carbon, polonium, cobalt or nickel, etc. may also be used. The oxygen electrode is improved in performance by wrapping it in a silver cellulosate wrapping. In place of this, sheets of methyl cellulose, polyvinyl alcohol, regenerated cellulose or other alkaline resistant membrane which are impermeable to gas but permeable to ions may be employed.

The fuel electrode is designated generally at 56 and comprises a plurality of carbon plates 58 held together by a stainless steel bolt 60. The plates 58 are maintained in spaced relationship by means of stainless steel separator nuts 62.

The carbon plates employed may be the "promethium-carbon" fuel electrode described in Example VI above. Likewise the "promethium-silver" fuel electrode described in Example VI above may also be employed. In a similar fashion other fuel electrodes described herein may also be employed and may have incorporated therein radioactive polonium, carbon, cobalt, nickel or other suitable radioactive material.

The electrolyte employed in this embodiment of the invention is aqueous KOH having a concentration of from 20–50% and preferably 40–45%. In this embodiment the liquid fuel is intermingled with the KOH electrolyte. Other alkaline electrolytes may also be employed in this system.

The fuel used in this cell is methanol or a mixture of methanol and formaldehyde. However, other alcohols e.g. ethanol or a mixture of other alcohols with aldehydes e.g. ethanol with formaldehyde may also be employed.

Figure 5:
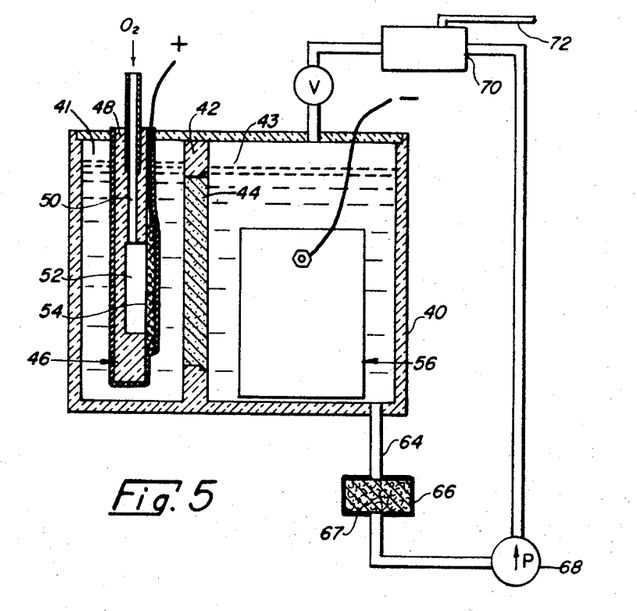
FIG. 5 is a diagrammatic representation, partly in cross-section of another fuel cell embodied in the present invention.
Figure 6:
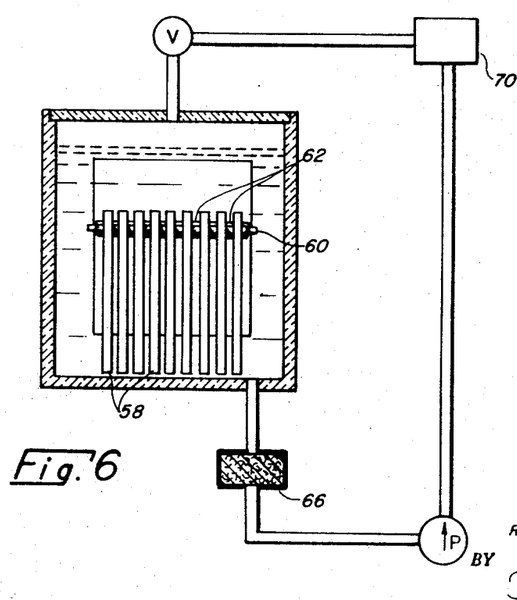
FIG. 6 is a side elevation of FIG. 5.

In the construction shown in FIG. 5 provision is made for continuously circulating and filtering the mixture of electrolyte and fuel to remove any deleterious reaction products which may be formed. The electrolyte and fuel mixture are conveyed by line 64 to filter 66 where the impurities are filtered out. Filter 66 may be filled with activated carbon 67 or other suitable absorbent. The mixture is then pumped by means of pump 68 to the fuel storage tank 70 where it is mixed with fresh fuel coming into the tank from line 72. This is then returned to the fuel electrode compartment 43.

EXAMPLE VIII

In this case the arrangement employed was that shown in FIG. 5. The oxygen electrode was a sintered silver electrode (1⅜" x 1⅝" x .034") impregnated with 50 milligrams of $C^{14}$.

The fuel electrode contained 7 carbon plates 1½" x 1½" x 3/16") made of dense carbon as described in Example VI impregnated with a platinum catalyst and 4 millicuries of promethium as described therein. Fifty percent aqueous KOH was placed in the $O_2$ electrode chamber and a mixture of 80 cc. methanol and 50 cc. of 50% aqueous KOH into fuel electrode compartment.

The $O_2$ electrode was wrapped in a silver cellulosate wrapper. The fuel electrodes were bolted together as described above in connection with FIG. 5 and the Alundum window in the separator, also described therein was employed. Both chambers were sealed to prevent evaporation.

Figure 7:
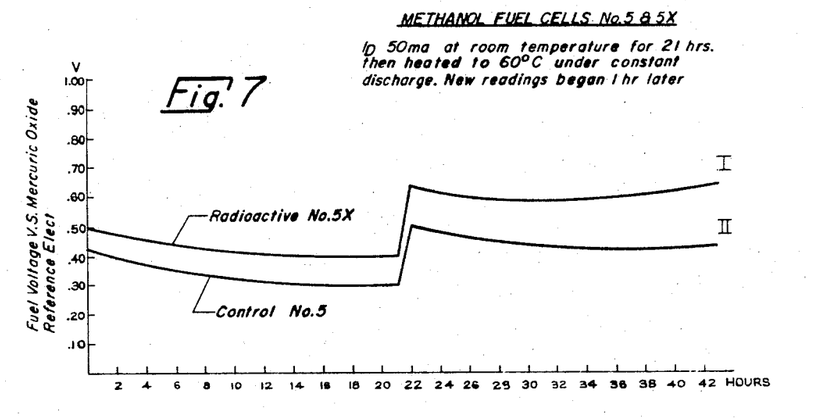
FIG. 7 is a graph illustrating the performance of a methanol fuel cell embodied in the present invention.

The performance of this cell is illustrated in the graph of FIG. 7. In the graph the voltage of the fuel electrode as compared with a mercuric oxide reference electrode, is plotted against the time in hours of discharge.

Curve I is the curve obtained under the conditions set forth above. Curve II is curve obtained under identical conditions excepting that the electrodes do not contain any radioactive material. The sharp rise in the curves occurred after heating to 60° C. as indicated in the graph. The superior performance of the radioactive electrode is obvious from these graphs.

EXAMPLE IX

In this case the electrodes and conditions were identical with those described in Example VIII above excepting that a different fuel mixture was employed. The fuel used was a mixture of 50 cc. of 50% aqueous KOH, 50 cc. of methanol and 30 grams of formaldehyde.

Figure 8:
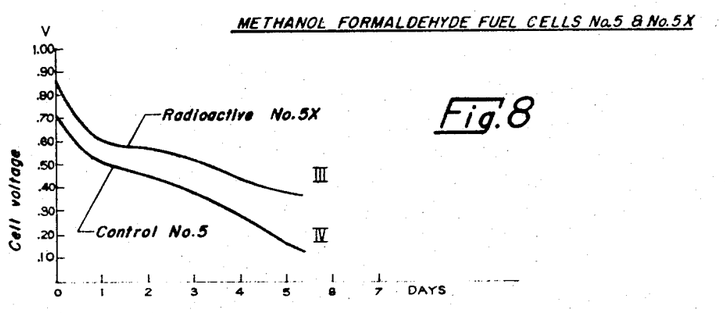
FIG. 8 is a graph illustrating the performance of a methanol-formaldehyde fuel cell embodied in the present invention.

The perforance of this cell is shown in the graph of FIG. 8 in which the cell voltage is plotted against the discharge time in days. Curve III is obtained with the radioactive electrodes whereas curve IV is obtained with the control electrodes which do not contain any radioactive material. Again, this superior result of the radioactive electrode is obvious from the graph.

EXAMPLE IX(a)

In this case the fuel cell consists of two electrodes, one oxygen and one fuel electrode. The oxygen electrode is composed of either silver+cobalt--aluminum-silver catalyst or of carbon with silver catalyst. The fuel electrode is nickel powder plus Raney nickel catalyst compressed and sintered.

Each electrode is impregnated with a radioactive material e.g. $C^{14}$. The electrodes are mounted over a chamber which, by a stainless steel tube, is connected to oxygen for the oxygen electrode, and methanol for the fuel electrode. The electrolyte is aqueous KOH in the concentration designated above (40–45%).

The silver-oxygen electrode is first wrapped in cellophane and then in nylon. This prevents any gaseous oxygen from diffusing through this electrolyte and causing a chemical oxidation of the Raney nickel. The fuel (methanol) enters the chamber through the stainless steel tube, thereby never coming in contact with the total electrolyte except at the three phase-zone at the surface of the fuel electrode. This prevents any chemical oxidation at the oxygen electrode, with the formation of $H_2O$ thus setting up a current limiting situation.

The radioactive electrodes play a prime role in the performance of this cell. Some of the probable effects are as follows: The destruction of ($HO_2^-$) into hydrogen and oxygen, a catalytic effect of breaking or weakening the chemical bonds of the fuel, the ionization of $H_2O$ to $H^+$ and $OH^-$, aiding in the changing of molecular $O_2$ to atomic oxygen.

This cell operates at room temperature, and at oxygen pressure at less than one atmosphere.

EXAMPLE X

A hydrogen electrode was prepared using the dense carbon plate described in Example IV. The carbon electrode was first treated with an aqueous solution of palladium nitrate as described in Example VI and then heated at 300° C. for 15 minutes to obtain metallic palladium on the electrode. The electrode was then treated with promethium chloride and the promethium was precipitated as described in Example IV.

Figure 9:
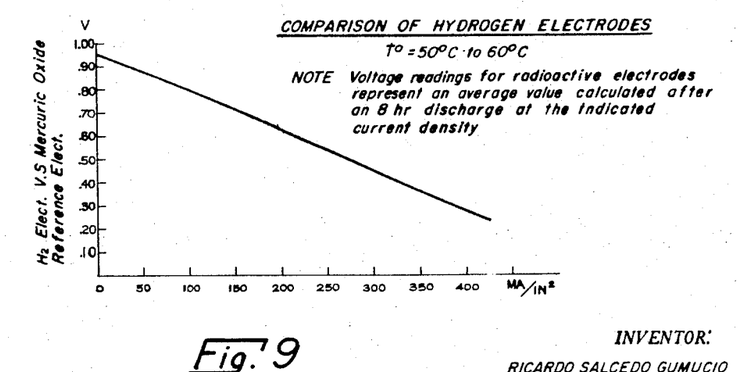
FIG. 9 is also a graph illustrating the performance of hydrogen fuel cell embodied in the present invention.

FIG. 9 illustrates the performance of this fuel electrode (employed as a hydrogen electrode) against a mercuric oxide reference electrode. The voltage of the cell is plotted against the discharging current density. The discharges in current density are average figures taken for about 8-hour periods.

EXAMPLE X(a)

Figure 10:
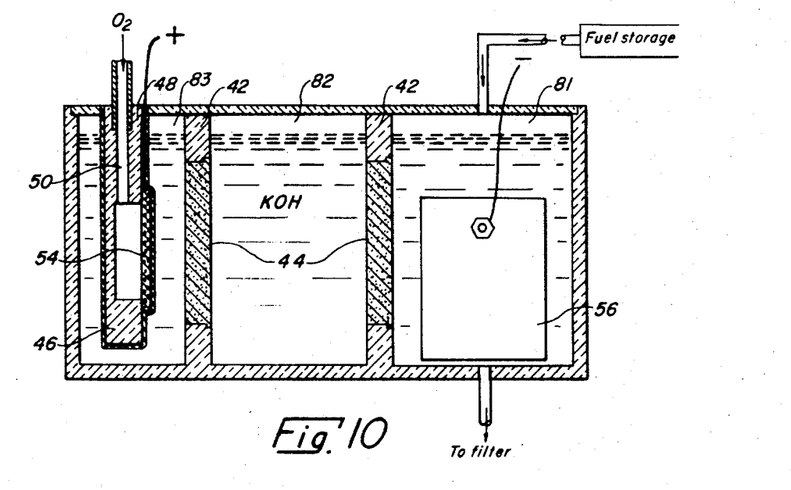
FIG. 10 is a diagrammatic representation in cross-section of another embodiment of the present invention.

FIG. 10 illustrates a three chamber methanol fuel cell. It is identical to the modification of this invention shown in FIG. 5 excepting that the electrolyte and the fuel are kept in separate chambers. Thus in this case the cell is divided into a fuel electrode chamber 81, an electrolyte chamber 82 and an oxygen electrode chamber 83. In place of the oxygen oxidant electrode other oxidants may be used. Furthermore, other fuels may be used in place of the methanol or methanol-formaldehyde.

EXAMPLE XI

Another facet of the present invention may be described in connection with FIGS. 11 and 12. This illustrates a hydrogen fuel electrode which has utility per se but may also have incorporated therein a radioactive catalyst in accordance with the present invention.

In this aspect of the invention, platinum black is added to an activated carbon electrode element 90. The activated carbon black is impregnated with an aqueous solution of platinum chloride as described in Example VI. The platinum metal is deposited in the electrode element in porous form by immersing the platinum chloride treated element in 44% aqueous KOH containing formaldehyde as the reducing agent.

The impregnated carbon element is then washed with distilled water until no more alkaline reaction takes place. Residual platinum chloride and other impurities may be removed by electrolysis. For this purpose the impregnated carbon element is placed in a cellophane bag and immersed into fresh water between two nickel electrodes with simultaneous flow of water. A potential is applied between the nickel electrodes to extract the cations and anions from the carbon electrode element until the milliammeter indicates that the current flow is similar to that of pure water. The electrode is then dried under mild conditions to eliminate water leaving a layer of platinum on the carbon surface. Instead of treating a preformed block of carbon, the same procedure may be employed in the treatment of activated carbon powder. The electrode element may then be formed by molding the treated powder.

Figures 11, 12:
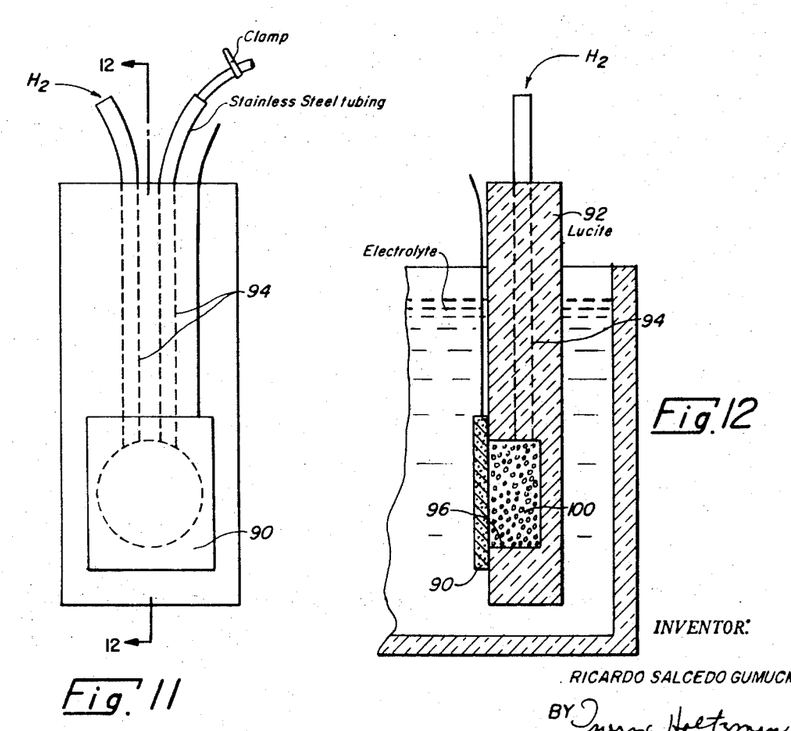
FIG. 11 is a front elevation of a hydrogen electrode embodied in the present invention.
FIG. 12 is a cross-sectional view of the electrode shown in FIG. 11 taken along line 12—12, the electrode being shown disposed in the electrolyte chamber.

As will be seen from FIGS. 11 and 12, the hydrogen electrode comprises a Lucite casing 92 housing a pair of conduits 94 cut through from the top to a lower chamber 96. A window is cut on the electrolyte side of the chamber 96 so that the contents of the chamber are in contact with the platinum black impregnated carbon electrode element 90. Electrode element 90 is secured to the Lucite casing in any suitable fashion and encloses a quantity of activated carbon 100.

Carbon 14 may be incorporated in activated carbon element 90 in any suitable manner to give a radioactive electrode.

EXAMPLE XI(a)

Another hydrogen fuel electrode which may be used in accordance with the present invention is an improved Raney chromium electrode. This is described in connection with FIG. 15. A sintered plate is formed from Raney chromium black platinum powder consisting of 46% aluminum, 49% nickel, 1% chromium and 4% platinum black. The aluminum is then leached from the electrode in the conventional manner and used to form element 300. This element is secured to Lucite casing 301 so that it forms a cover for chamber 302 of the lucite casing. Chamber 302 is filled with activated powdered Raney chromium platinum 34 prepared as described above. This may also be rendered radioactive by any of the methods described above.

Figure 15:
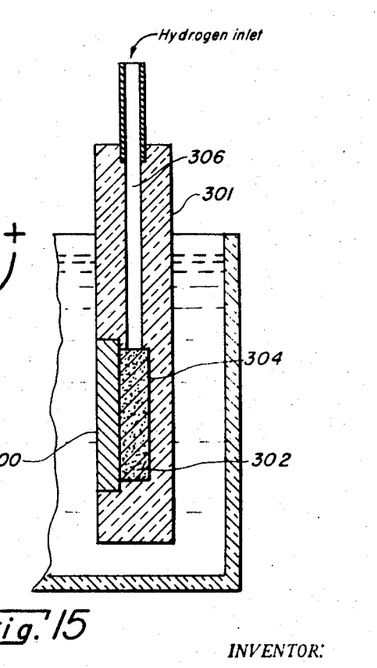
FIG. 15 is a diagrammatic representation of an another electrode which is embodied in the present invention.

A hydrogen conduit 306 is bored through the length of the Lucite casing from the top to the chamber 302 and serves to convey hydrogen from a source into the electrode.

EXAMPLE XII

In this aspect of the invention an effort is made to prevent the oxidation of the electrodes. This fuel cell consists of two radioactive electrodes, the oxygen electrode consists of silver plus an aluminum-cobalt-silver catalyst or carbon with a silver catalyst. The hydrogen electrode consists of Raney nickel-chromium plus platinum. In addition the Raney electrode is treated with a 5% acetone solution of either resorcinol monobenzoate, p-octylphenyl salicylate, or 2,4,5 trihydroxybutyrophenone. These serve as anti-oxidants. They prevent oxidation of the Raney electrode by either atomic or molecular oxygen.

The oxygen electrode is wrapped first in cellophane then in nylon. This prevents any molecular oxygen from escaping into the electrolyte, and causing chemical oxidation of the Raney electrode. The electrodes may be rendered radioactive by any of the methods described above.

The radiation causes greater dissociation of molecular $H_2$ and $O_2$ into atomic hydrogen and oxygen on the electrode surface. It also destroys the $HO_2^-$ ion into hydrogen and oxygen and ionizes water into $H^+$ and OH.

EXAMPLE XIII

This embodiment of the present invention illustrates its application to a non-aqueous system. This is described in connection with FIG. 13. It comprises a radioactive carbon electrode 100 exposed to several hundred degrees of temperature. On top of this is a mixture of lithium and potassium nitrates (30%–70%) 102, which serves as solid electrolyte. On top of this is an asbestos matrix 104.

Figure 13:
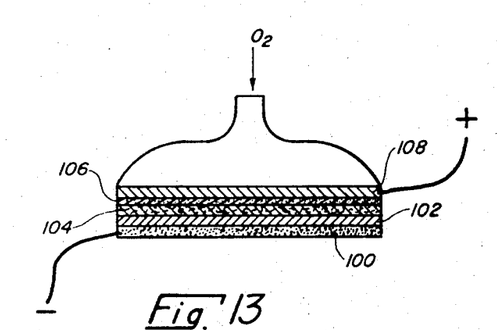
FIG. 13 is a cross-sectional view of another fuel cell embodied in the present invention.

On top of the matrix is a layer of copper powder 106 and on top of this rests a porous silver electrode 108 with a chamber 110 behind it connected to an oxygen source.

As heat is applied the hot carbon is oxidized while the lithium and potassium nitrates are reduced to $NO_2$; then the oxygen from either the atmosphere or an external source oxidizes the nitrites to nitrate again. The copper acts as the catalyst changing molecular oxygen to atomic oxygen. The reaction is as follows:

$C + 2O \longrightarrow CO_2 + 2e$
$Li(NO_3) + K(NO_3) \longrightarrow Li(NO_2) + K(NO_2) - 2e$

EXAMPLE XIV

This embodiment of the present invention illustrates the application of the present invention to the amalgam fuel cells. This is illustrated in connection with FIG. 14.

Figure 14:
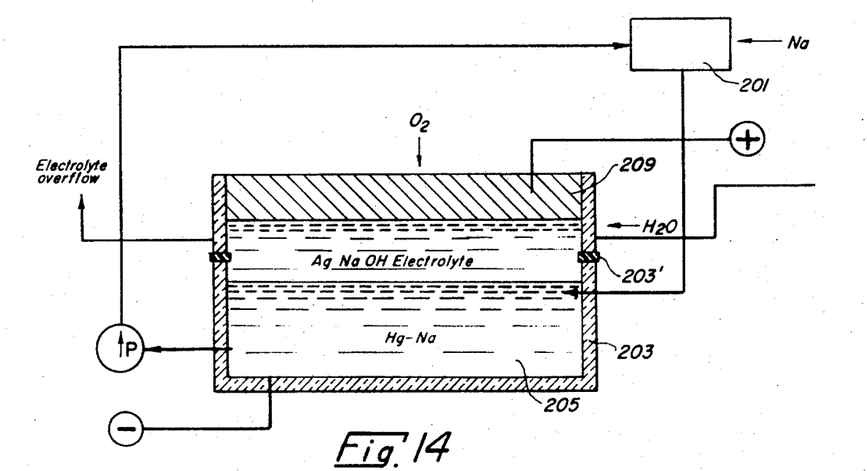
FIG. 14 is a diagrammatic view of a sodium amalgam fuel cell embodied in the present invention.

This cell consists of a flowing column of a sodium-mercury amalgam which is formed in amalgamator 201. The amalgam flows into a stainless steel vessel 203 and forms a pool of mercury-sodium metal amalgam 205. This acts as the cathode. Either a carbon or silver oxygen electrode 209 with catalyst and radioactivity acts as the anode. The electrolyte is the corresponding alkali base (40–45% aqueous NaOH). Stainless steel vessel 203 is formed in two sections which are separated from each other by an insulating member 203′. These vessel sections serve as terminals for the fuel cell. As the flow of amalgam reaches the electrolyte, the sodium amalgam is oxidized to form the alkali base and the mercury carrier loses the two sodium ions. The sodium-poor amalgam is recovered by an overflow mechanism and is recycled to the amalgamator 201. Water is stoichiometrically added to the electrolyte to maintain a constant hydroxide ion concentration. There is also an overflow mechanism to recover the excess base formed in the reaction.

The radioactive material helps in oxidation of the amalgam, and the destroying of the $(HO_2^-)$ ion. It also catalytically changes the molecular oxygen into atomic oxygen. The oxygen pressure is less than one atmosphere.

The following examples illustrate another feature of the present invention, namely the waterproofing of the electrodes.

EXAMPLE XV

A sintered silver-oxygen electrode prepared in accordance with U.S. Patent 2,610,219 was dipped for 2 minutes in a Teflon (polytetrafluoroethylene) suspension which was reduced with water to 15% solids. The electrode so prepared is placed in an oven at 60° C. for 20 minutes and after the water is dried out, the electrode is heated at 300° C. for 1 hour to fuse the Teflon. After cooling, the electrode is ready for use. It exhibits a high degree of hydrophobic character which can be seen when a drop of alkali or water is placed on the electrode. It does not absorb the drop. The Teflon impregnation prevents the electrolyte from drowning or flooding of electrodes. Although this electrode has utility as such it may be rendered radioactive in accordance with any of the procedures outlined above.

EXAMPLE XVI

Same as Example XV except that a carbon-oxygen electrode is used in place of silver-oxygen electrode. The electrode is also useful as such but may be rendered radioactive in accordance with any of the procedures outlined above. The Teflon impregnated electrodes give superior performance in a fuel cell. The accompanying table shows the results:

| | Open circuit voltage | Voltage at— | |
| --- | --- | --- | --- |
| | | 100 ma. | 1,000 ma. |
| 1. Paraffin impregnated electrode | +.19 | −.09 | −.74 |
| 2. Teflon impregnated electrode | +.30 | −.02 | −.36 |

In the table above, the voltages of oxygen electrode are measured against a mercuric oxide reference electrode in 6 N KOH. A high positive value and a low negative value of voltage means improvement.

EXAMPLE XVII

Zinc-$O_2$ (fuel cells) KOH electrolyte

By using a waterproofing system, consisting of a thin Teflon coating on the oxygen-silver electrode, it is possible to get a higher open circuit and working potential and greater stability at both high and low discharge rate. The loss of potential due to pore drowning appears to be eliminated. This type of electrode discharged at 1.000 ma. against a zinc electrode gives a potential of −.40 v. vs. HgO reference which is far superior to any previous results with any type of conventional oxygen electrode. Also the addition of CaO to the electrolyte in sufficient quantity so as to form a layer at the bottom of the cell to remove any zincate ions formed also adds considerably to the stability and potential of this system.

This system was run continuously for 5 days with these results; the initial closed circuit voltages at 100 ma. discharge are:

| | Volts |
| --- | --- |
| $\epsilon\, O_2$ | −.02 |
| $\epsilon\, Zn$ | −1.40 |
| $\epsilon$ total | 1.38 |

After 72 hours:

| | |
| --- | --- |
| $\epsilon\, O_2$ | −.08 |
| $\epsilon\, Zn$ | −1.41 |
| $\epsilon$ total | 1.33 |

The results may be improved by rendering the oxygen-silver electrode radioactive as described above.

EXAMPLE XVIII

The $O_2$-amalgam cell

A Teflon waterproofed silver electrode as the oxygen electrode described above and a plastic supported rectangle of mercury with a one-square-inch face of mercury cutout and contained by a piece of cellophane and nylon was employed. These are arranged parallel to each other and a minute distance away.

A constant dripping of mercury amalgam is added to the fuel electrode, constantly exposing new surface area. The voltages attained at 500 ma. discharge are:

| | Volts |
| --- | --- |
| $\epsilon\, O_2$ | −.20 |
| $\epsilon$ fuel | −1.60 |
| $\epsilon$ total | 1.40 |

The performance of this cell may also be improved by incorporating radioactive materials in the electrodes.

EXAMPLE XIX

In another aspect of the present invention two identical electrodes are employed, excepting that one electrode is radioactive. This may be illustrated by a cell comprising one graphite electrode 1⅜″ x 1⅝″ x .034″ impregnated with about 1 millicurie of radioactive carbon and a second electrode of the same dimensions and material without the radioactive carbon. The electrolyte is preferably a 40–45% aqueous KOH.

The electrode reactions in this case may be written as follows:

At the radioactive electrode or anode:

$$2K^+ + 2e \rightarrow 2K$$
$$2K + 2H_2O \rightarrow KOH + H_2$$

At the non-radioactive electrode or cathode:

$$2(OH) - 2e \rightarrow H_2O + O$$

Numerous modifications and embodiments of this invention can be made without departing from the spirit and scope thereof, it being understood that the invention is not to be limited to specific details of the foregoing disclosure except as defined in the appended claims.

What is claimed is:
1. A battery comprising:
   a carbon anode and a carbon cathode only said anode containing a radioactive catalyst;
   an aqueous alkaline electrolyte in contact with said anode and cathode;
   and a load circuit connected across said anode and cathode.
2. A battery as defined in claim 1 wherein said catalyst is radioactive carbon.
3. A battery as defined in claim 1 wherein said electrolyte is an aqueous solution of potassium hydroxide.

References Cited

UNITED STATES PATENTS

| | | | |
|---|---|---|---|
| 1,182,513 | 5/1916 | Thofehrn | 136—20 |
| 1,217,738 | 2/1917 | Flannery | 136—146.6 |
| 1,217,739 | 2/1917 | Flannery | 136—146 |
| 1,317,082 | 9/1919 | Hartenheim | 136—165 |
| 2,610,219 | 9/1952 | Yardney. | |
| 2,925,454 | 2/1960 | Justi et al. | 136—86 |
| 2,962,431 | 11/1960 | Gladrow | 252—444 |
| 3,019,358 | 1/1962 | Ohmart | 136—100 |

FOREIGN PATENTS

| | | |
|---|---|---|
| 220,422 | 8/1924 | Great Britain. |
| 233,847 | 9/1959 | Australia. |
| 973,217 | 9/1958 | France. |

WINSTON A. DOUGLAS, Primary Examiner

H. A. FEELEY, Assistant Examiner

U.S. Cl. X.R.

136—84, 121